Figure 1:
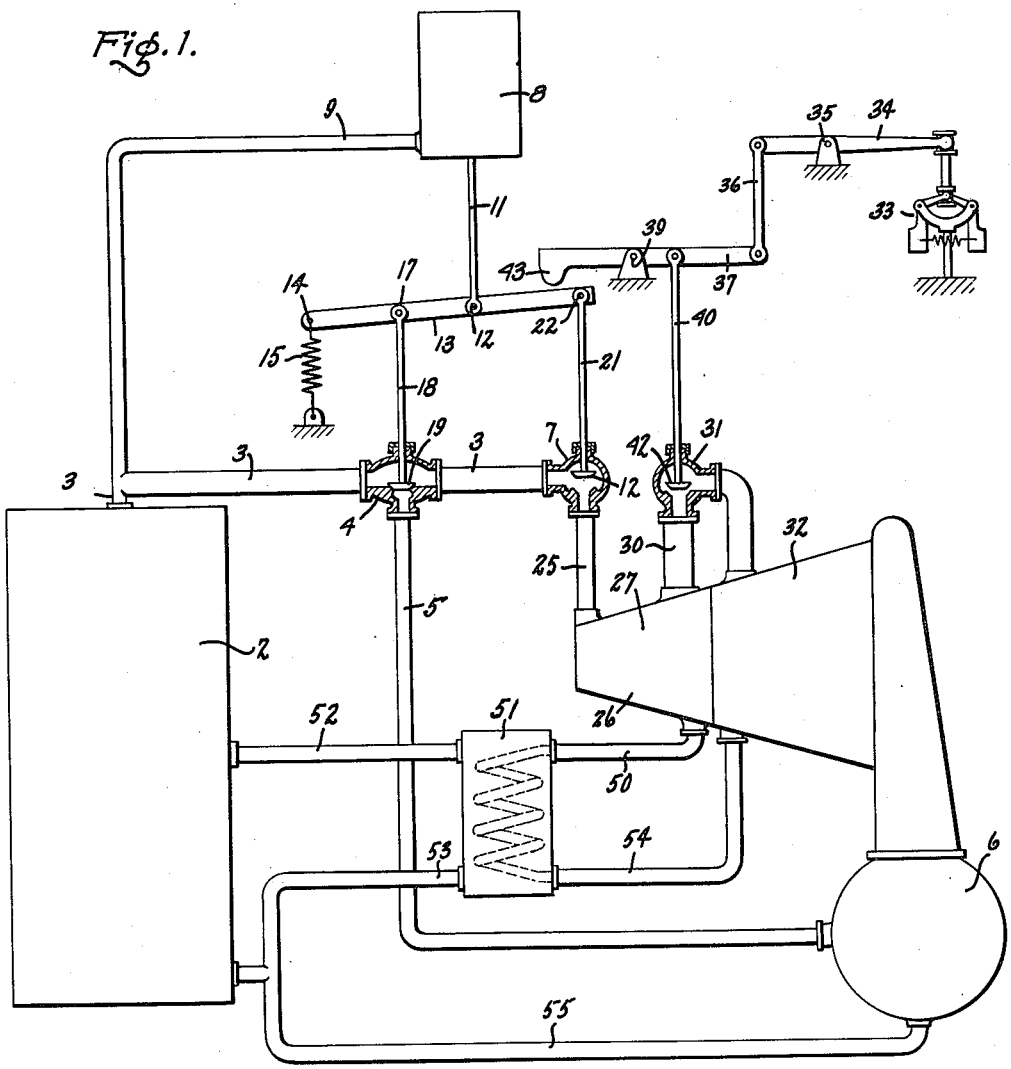

July 14, 1964     D. H. BROWN     3,140,588

REACTOR-TURBINE CONTROL SYSTEM

Filed Dec. 29, 1960

ENTHALPY

ENTROPY

Inventor
Dale H. Brown
by Paul G Frank
His Attorney

United States Patent Office 3,140,588
Patented July 14, 1964

3,140,588
REACTOR-TURBINE CONTROL SYSTEM
Dale H. Brown, Scotia, N.Y., assignor to General Electric Company, a corporation of New York
Filed Dec. 29, 1960, Ser. No. 79,376
3 Claims. (Cl. 60—73)

The present invention relates to fluid power control systems, and more particularly, to fluid power systems for multistage engines employing reheat cycles.

At the present time, boiling water reactors, because of the attractiveness of their control systems, are preferred in nuclear power plants. One of the major difficulties accompanying the use of boiling water reactors is that the steam turbines utilized therewith require expensive erosion protection whenever the moisture in the steam exceeds approximately 15%. For this reason, it is common to complement a boiling water reactor with a fossil fuel fired superheater to provide superheated steam and thereby avoid the need for expensive erosion resistant features in portions of the turbines which would normally handle excessively wet steam.

Generally, in boiling water reactors, the water acts as a heat exchange medium and also as a moderator for neutrons to increase the probability of occurrence of fission reactions. A portion of the water is converted into steam within the reactor and constitutes the working fluid in the turbine usually associated therewith. The steam is caused to flow directly from the reactor to the turbine to supply heat energy for operating the turbine.

A boiling water reactor can be designed so that the formation of steam bubbles decreases the atomic ratio of water to fuel, thereby decreasing the amount of moderator in the reactor core and the reactivity of the reactor. In such a system, an increase in reactivity tends to increase heat generation and the formation of steam bubbles, which bubbles in turn tend to decrease reactivity. Such a reactor fails safe and is said to be self-regulating.

One way of controlling a nuclear reactor is by varying the position of neutron-absorbing control rods located within the reactor. While the reactivity of the reactor may be so controlled, this method of control generally involves complicated and power consuming apparatus and is preferably avoided.

The chief object of the present invention is to provide an improved nuclear power system.

Another object is to provide an improved method and apparatus for controlling a fluid power system employing a multistage engine.

A further object is to provide an improved method and apparatus for controlling a multistage engine supplied with working fluid from a nuclear reactor.

A still further object is to provide an improved method and apparatus for controlling a multistage engine supplied with working fluid from a nuclear reactor utilizing a reheat cycle wherein the working fluid utilized in the reheat portion of the cycle controls the energy output of the reactor.

These and other objects of my invention will be more readily perceived from the following description.

In accordance with one aspect of this invention there is provided a control system wherein working fluid from a supply means, preferably a nuclear reactor, is passed to the first stage of a multistage engine, this working fluid then being passed into a reheat heat exchanger before being introduced into the reheat stage of the engine. The energy output of the working fluid supply means is controlled in response to the discharge condition of the heat exchange medium utilized to reheat the working fluid.

While the practice of this invention is subject to a wide variety of modifications and variations, it is suited for use with boiling water type nuclear reactors for supplying power to turbine systems and is particularly described in this connection.

Figure 2:
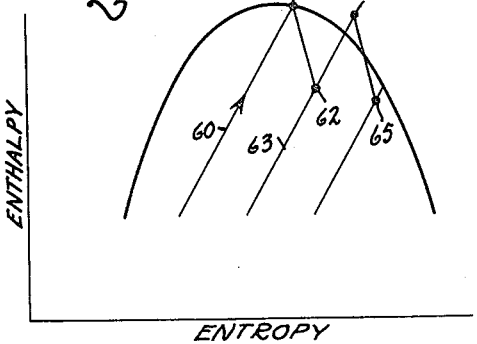

The attached drawings illustrate a preferred embodiment of this invention, in which:

FIGURE 1 is a schematic view of a nuclear reactor powered turbine system regulated by the control system of the present invention; and FIGURE 2 is a diagram plotting enthalpy vs. entropy for a portion of the steam cycle utilized in the apparatus illustrated in FIGURE 1.

FIGURE 1 illustrates a system employing a boiling water reactor, the nature of such reactors being known in that water is utilized as a moderator and also as a coolant and that momentary increases in coolant density results in increased thermal energy output from the reactor. During the period of the increased coolant density the neutron economy is such that the power level continues to increase for the duration of the period of above normal coolant density. From this, it is known that heat output of the reactor is a function of the condition of the coolant supplied to the reactor and also a function of the steam bubbles present in the reactor which is a further function of the heat rate of the turbine associated with the reactor.

In order to simplify the description of the invention, details of the reactor such as control rods, circulating pumps, and instrumentation have not been illustrated. Also, it should be appreciated that the reactor illustrated in FIGURE 1 is actuated in a conventional manner and that the general operating level of the reactor is determined by appropriate positioning of the control rods. Once the general operating level is established, the control system of this invention may be used to control the reactor and the turbine system associated therewith.

In the apparatus illustrated in FIGURE 1, working fluid in gaseous form is passed from reactor 2 through conduit 3 to bypass valve 4 which is associated through conduit 5 with condenser 6, bypass valve 4 being utilized to accommodate working fluid being supplied to reactor 2 in the event that throttle valve 7 is closed. Working fluid being passed to turbine 26 is supplied into the first stage 27 thereof through throttle valve 7 and conduit 25. It will be appreciated that other engines such as reciprocating engines may be used, the basic premise being that a multistage engine is utilized. Bypass valve 4 and throttle valve 7 are controlled by a pressure regulator 8 which is associated by means of conduit 9 with high pressure conduit 3.

Pressure regulator 8 is connected by means of control rod 11 at pivot point 12 with throttle lever 13 which is yieldably pivoted at point 17. Movement of rod 11 moves control rod 21 which is associated at point 22 with control lever 13 to actuate valve member 21 of throttle valve 7. Pivot point 17 is also associated with control rod 18 having valve member 19 of bypass valve 4 associated therewith. Spring 15 connected at point 14 to control lever 13 when flexed permits pivot point 17 to move thereby controlling bypass valve 4. From this it can be seen that during normal operation, pressure regulator 8 determines the position of valve member 12 of throttle valve 7. However, under certain circumstances, when throttle valve 7 approaches a closed position, control lever 13 pivots about point 12 so that bypass valve 4 is opened permitting high pressure working fluid to pass through conduit 5 to condenser 6.

After the working fluid has been suitably expanded in first stage 27 of turbine 26, the working fluid may be discharged through bypass line 30 and bypass valve 31 into a second stage 32 which may constitute a reheat stage of the multistage engine. In the present embodiment, bypass valve 31 may be actuated by a suitable speed responsive governor 33 such as the flying ball governor illustrated. At speeds greater than normal, operating speed lever 34 moves about pivot point 35 in a general clockwise direction thereby moving lever 37 pivoted at point 39 through link connection 36. This clockwise motion of lever 34 causes counter clockwise motion of lever 37, resulting in upward movement of control rod 40 associated with valve member 42 of bypass valve 31 thereby increasing the proportion of bypass fluid from first stage 27 to reheat stage 32 of turbine 26.

With decrease in speed, governor 33 causes counter clockwise motion of lever 34 which results in clockwise movement of lever 37 and consequent closure of bypass valve 31, decreasing the proportion of bypass fluid.

Another feature of the governor control portion of the system is the association of the governor with the throttle valve in such a manner that when bypass valve 31 is fully open and the speed of the turbine does not diminish, continued motion of lever 37 results in abutment 43 engaging lever 13 associated with throttle valve 7 in such a manner that the governor may close throttle valve 7 and cause pivotal motion of lever 13 about pivot point 12 to open the bypass valve 4.

First stage 27 of turbine 26 is provided with two discharge outlets, conduit 30 which is a bypass outlet and conduit 50 which passes working fluid through reheat heat exchanger 51 and supplies the reheated working fluid to second stage 32 (reheat stage) of the turbine system. The condition of the working fluid discharged from the first stage controls the energy output of reactor 2. The reheated fluid is mixed with the bypass fluid and expanded in reheat stage 32 and discharged into condenser 6 from whence the condensate is passed through conduit 55 to reactor 2.

Reheating is performed in the present invention by utilization of working fluid liquid (reactor coolant) which is supplied to reheat heat exchanger 51 through conduit 52 from nuclear reactor 2 and returned through conduit 53 with condensate from condenser 6 returning through conduit 55. The mixed fluids are returned to the nuclear reactor and act as moderators and thereby control the heat generated in the reactor in response to turbine load conditions.

In operation, working fluid vapor such as steam is supplied at high pressures through conduit 3 to throttle valve 7 where pressure regulator 8 regulates the passage of working fluid to the first stage of turbine 26. Load conditions on the turbine determine the condition of the working fluid discharged from the first stage and also the condition of the reheat exchanger fluid returned to reactor 2 which determines the thermal output thereof. Changes in load condition initially increase and decrease turbine speed, prompt compensation for changes in speed is made by governor 33 which is associated through levers 34 and 37 with control rod 40 of bypass valve 31 and through abutment 43 with lever 13 and control rod 21 of throttle valve 7. During normal operation, changes in load are accommodated by the bypass valve 31 which determines the amount of reheat supplied the working fluid passed into reheat stage 32 of turbine 26. This reheat is supplied to working fluid discharged through conduit 50 to reheat heat exchanger 51. The reheated vapor is supplied to the turbine through conduit 54. As previously mentioned, in the event that the speed of the turbine becomes excessive, the governor may override the pressure regulator 8 by changing the pivot point of control lever 13 from point 17 to point 12 thereby causing throttle valve 7 to close and bypass valve 4 to open or to assume positions where main steam flow is proportioned between them.

The present invention not only supplies a control system for the turbine but also a control for the working fluid supply means which in the present embodiment is nuclear reactor 2. It is assumed that the reactor is normally stable and has a constant level thermal output except when it is disturbed by the introduction of other than normal conditions. Thus, the initial thermal output maintains until inlet fluid temperature results in a density change of the moderator. During the time of this density change, the thermal output increases or decreases. With a density increase, the thermal output is increased. When the inlet density of coolant from reheat heat exchanger 51 returns to a normal level, the thermal output of the reactor returns to its previous level. In the event that the reheat heat exchanger supplies warmer fluid of less density, the reactor during this period operates at a lower energy output.

This reactor control mechanism with the previously described turbine control means, accommodates load conditions by acting on governor 33. Pressure regulator 8 sensing steam pressure in the reactor does not directly respond to load changes. As a result, the initial change in load results in the action of the reheat portion of the system as controlled by bypass control valve 31. In the event that the valve closes, more working fluid is reheated in heat exchanger 51. In the event that the bypass valve 31 opens, less fluid is reheated. With increased reheat, there results a decrease in temperature of the working fluid (coolant) being returned to the reactor. This colder and more dense reactor coolant results in an increase in the reactor neutron economy and the energy output increases. As a result, the flow of working fluid from the reactor which is controlled by the pressure regulator increases. Pressure regulator 8 opens throttle valve 7, the governor then causes bypass valve 31 to return to a more open position similar to its initial position wherein less reheat was applied to the fluid being discharged from first stage 27 of turbine 26. In this manner, the influence of reheat heat exchanger 51 is moderated and the entire unit reaches a new stable operating level with a greater steam flow satisfying the load demands imposed upon the turbine.

In the reverse situation, wherein the governor causes an increase in bypass of working fluid from first stage 27 to reheat stage 32 of turbine 26, higher temperature reactor fluid (coolant) leaves reheat heat exchanger 51 through conduit 53 and returns to nuclear reactor 2. Since warmer and less dense moderator is being supplied to the nuclear reactor, the energy output and working fluid flow from the reactor decreases and this is compensated by pressure regulator 8 which closes throttle valve 7 partially permitting governor 33 to move valve 42 of bypass valve 31 to a neutral position and a new stable operating level is achieved.

This control system works in harmony with the concept of a reheater which provides to later sections of a steam turbine superheated steam or other working fluid. The control is also harmonious with the operation of boiling water reactors or steam produced by any other reactor systems such as pressurized water reactors, sodium cooled reactors, and others. This is emphasized by the promptness and extent of coupling between the turbine control and the reactor control.

As initially noted, the present invention is directed to an integrated reactor-steam turbine type control which avoids the disadvantages of previously used systems wherein the later stages of the turbine utilize excessively wet steam which creates great erosion problems on the blades of the turbine and which also avoids the need for expensive erosion protection to these components. This particular feature is illustrated in FIGURE 2 wherein there is shown a steam cycle for a system utilizing the apparatus in FIGURE 1 plotting enthalpy vs. entropy. Initially, steam is heated along constant pressure line 60 until the substantially saturated condition at point 61 is achieved. The steam is then expanded along the line 61–62 to a greater moisture level on the constant pressure line 63 which moisture level is preferably less than approximately 15%. At this point (62), the steam is reheated along the constant pressure line and in this instance, the steam is superheated by reactor liquid to a superheated condition at this lower pressure level at point 64. It will be also appreciated that the condition of the steam at point 62 determines the condition of reheat heat exchange liquid returned to the reactor and in this manner the condition of the steam at point 62 controls the thermal output of the reactor. The steam at point 64 is expanded in the reheat section of the turbine to point 65 which as can be seen is also at a moisture content less than 15%.

It is apparent that the control system of the present invention is suited for use with nuclear reactors for driving steam turbines and similar multistage engines in such a manner that the engine control system is integrated with the reactor control system whereby load conditions sensed by the engine are immediately accommodated by the application of increased reheat. The requirement for increased reheat is responded to by the nuclear reactor increasing the energy output thereof. This reheat cycle which lends itself to the use of an integrated turbine-reactor control system also supplies steam at saturated and superheated conditions in a manner to permit the use of less expensive engine components which in normal practice require extensive erosion protection due to the use of extremely wet steam.

While I have described a preferred embodiment of the invention, it will be understood that the invention is not limited thereto since it may be otherwise embodied within the scope of the appended claims.

What I claim as new and desire to secure by Letters Patent of the United States is:

1. In a control system, the combination of an engine having a first stage and reheat stage and being adapted to utilize a working fluid, a nuclear reactor utilizing working fluid as a moderator, said nuclear reactor supplying working fluid in a gaseous form to the first stage of said engine and liquid working fluid for reheat, means for supplying gaseous working fluid to the first stage of said engine, a reheat heat exchanger for receiving a controlled quantity of gas discharged by the first stage for passage to the reheat stage, means for supplying liquid working fluid to the reheat heat exchanger to be placed in heat exchange relation with said controlled quantity of gaseous working fluid discharged from the first stage of the engine, and means for controlling the energy output of the nuclear reactor in response to the condition of the liquid working fluid discharged from the reheat heat exchanger.

2. In a control system, the combination of:
   (a) an engine adapted to be operated by a working fluid, said engine having a first stage and a reheat stage,
   (b) a nuclear reactor adapted to utilize said working fluid as a moderator, said reactor supplying said working fluid to said first stage of said engine,
   (c) heat exchange means,
   (d) means responsive to engine load conditions for controlling the quantity of working fluid discharged from said first stage to said heat exchange means in accordance with variations in engine load,
   (e) means for supplying a portion of said moderator to said heat exchange means to be placed in heat exchange relationship with the controlled quantity of working fluid, and
   (f) means for controlling the energy output of said reactor in response to the condition of said working fluid discharged from said first stage and in response to the condition of said moderator discharged from said heat exchange means.

3. In a control system, the combination of:
   (a) an engine adapted to be operated by a working fluid, said engine having a first stage and a reheat stage,
   (b) a nuclear reactor adapted to utilize said working fluid as a moderator, said reactor supplying a first portion of said working fluid in gaseous form to said first stage,
   (c) means for connecting the discharge outlet of said first stage to the inlet of said reheat stage, the connecting means including a reheat heat exchanger and a duct bypassing said heat exchanger,
   (d) means responsive to engine load conditions to control the quantity of said first portion of said working fluid admitted to said heat exchanger in accordance with variations in engine load,
   (e) a second portion of working fluid supplied by said reactor in liquid form to said heat exchanger, said second portion being placed in heat exchange relationship with said controlled quantity of said first portion of working fluid, and
   (f) means for supplying said liquid working fluid discharged from said heat exchanger to said reactor to control the energy output of said reactor in response to the condition of said working fluid discharged from said first stage and in response to the condition of said liquid working fluid discharged from said heat exchanger.

References Cited in the file of this patent

UNITED STATES PATENTS

| | | |
|---|---|---|
| 2,865,827 | Dwyer | Dec. 23, 1958 |
| 3,022,235 | Brown et al. | Feb. 20, 1962 |
| 3,029,197 | Untermyer | Apr. 10, 1962 |
| 3,042,600 | Brooks | July 3, 1962 |
| 3,061,533 | Shannon et al. | Oct. 30, 1962 |

FOREIGN PATENTS

| | | |
|---|---|---|
| 806,068 | Great Britain | Dec. 17, 1958 |
| 841,920 | Great Britain | July 20, 1960 |
| 849,958 | Great Britain | Sept. 28, 1960 |
| 1,182,895 | France | Jan. 19, 1959 |